Patented June 23, 1953

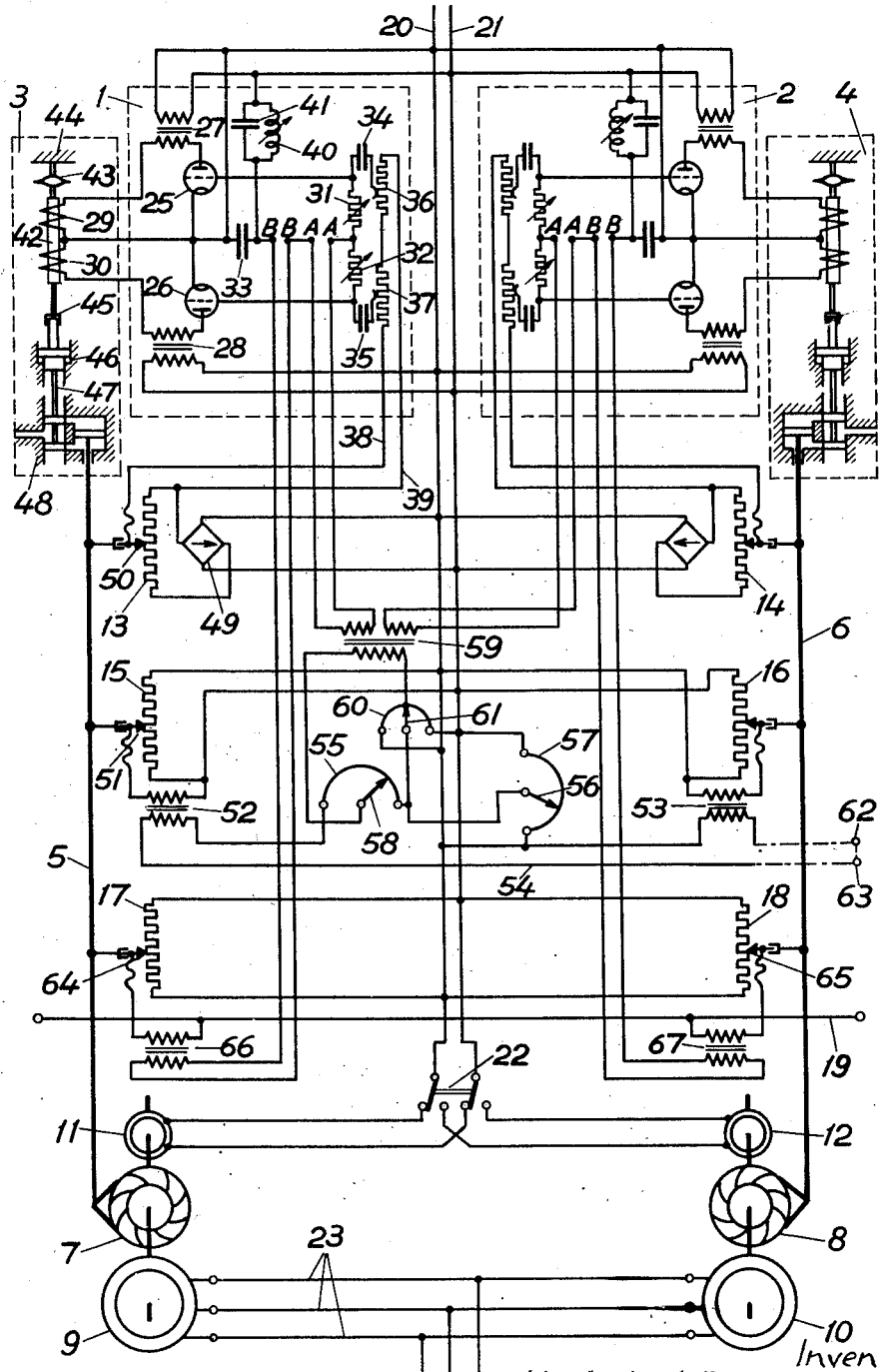

2,643,345

UNITED STATES PATENT OFFICE 2,643,345

MEANS FOR GOVERNING POWER STATIONS

Knut Almström, Aage Garde, Sven Eric Hedström, and Einar Brodersen, Vasteras, Sweden, assignors to Allmanna Svenska Elektriska Aktiebolaget, Vasteras, Sweden, a corporation of Sweden Application January 5, 1951, Serial No. 204,644
In Sweden March 11, 1949

4 Claims. (Cl. 290—4)

This invention relates to means for governing power stations consisting of prime movers and their generators. The regulating factors are electrical quantities fed into the control circuit of an electrically operated regulator arranged for each prime mover.

One object of the invention is to achieve an electrical regulating equipment which provides for every regulation requirement.

Another object is to achieve the possibility of effecting manual adjustment of the characteristic features of the regulating equipment.

A further object is to make the regulating equipment adaptable to parallel operation with other prime movers.

By means of the invention, great accuracy and speed of regulation are combined. Examples of different regulating requirements, which may arise, are: the regulation of one or more power stations with respect to frequency or power or the combination of these quantities, regulation of constant line power, power regulation according to water level, regulation of the mean value of water flow, regulation with synchronous time control, regulation of a power station comprising several prime movers with respect to a certain regulation scheme, regulation for limiting the water hammer, regulation of steam pressure or temperature, or both, in the case of steam turbines. The device also permits combined regulation with respect to all said quantities.

In addition to these regulating operations, it is also possible to provide for other common regulating requirements, and furthermore it is possible to cater for new, important regulating demands.

According to the invention, the quantities necessary for the regulation are fed into the control circuit of an electrically controlled regulator arranged for each prime mover, this being possible as all these quantities can always be transformed into electrical voltages. The characteristic feature of the governor according to the invention is that the control circuit of each regulator within a power station is arranged, inter alia, to receive electrical input quantities which are derived from two separate current systems common to the prime movers of the power station. In one of the current systems voltages are introduced, which are mainly proportional to the power output from the corresponding prime mover, and the sum of these voltages is compared with an adjustable voltage, forming a differential voltage, which is supplied to the control circuit of each regulator. In the other current system, a member is provided for each prime mover, the operation of each such member depending upon the position of the mechanism controlling the flow of the energy medium, so as to give a voltage corresponding to the position of said mechanism, and the control circuit of each regulator being supplied with a voltage consisting of the difference between the voltage of said members and the mean value of the voltage of all the members.

In the accompanying drawing a form of the invention is shown, which is intended to be used at a power station consisting of two water turbines with generators working in parallel.

According to the form shown, each prime mover is provided with an electronic regulator 1, 2, respectively, from which input quantities are fed into an electro-hydraulic device 3, 4, respectively, also containing hydraulic servomotors. From said devices extend gate shafts 5, 6, respectively, by means of which the gate mechanism of the turbines 7, 8, respectively, may be operated. Generators 9, 10, respectively, are connected to the turbines as well as the tachometer generators 11, 12, respectively.

In the drawing, the gate shaft operates the movable contact of three different potentiometers, one of which, 13, 14, respectively, is arranged as an anti-hunting device to produce a damping or stabilising effect on the governors. Another potentiometer 15, 16, respectively, is arranged to supply voltages to a current system common to the power station, which is mainly proportional to the power output from the corresponding turbine.

The potentiometers 17, 18, respectively, are connected in parallel, and are thus part of a further current system common to the power station, and the grid circuit of each regulator is fed with a voltage consisting of the difference between the voltage derived from the potentiometers 17, 18, respectively, and the mean value of the voltages derived from both potentiometers 17, 18. This voltage difference is obtained by connecting the movable contacts of the parallel connected potentiometers to a conductor 19 common to the power station. In order to provide the regulators, the said potentiometers and the common current systems with voltage, these members may, as shown by the figure, be connected to two leads 20, 21, respectively, which may be connected to either of the tachometer generators 11 or 12 by means of a two-way switch 22. The generators 9, 10 are shown electrically connected by means of bus bars 23, and from these extends the line 24.

The regulators 1 and 2 are identical, and therefore the description hereinafter refers in detail only to the elements belonging to the regulator 1.

Two thermionic tubes, 25 and 26, in the figure shown as triodes, are balanced and fed via the transformers 27, 28 from the previously mentioned leads 20, 21. The anode current from each tube energizes one half 29, 30 of the regulator coil of the electro-hydraulic device 3. The central tapping of said regulator coil is connected to the cathodes of the tubes. The grids of the tubes are connected to the cathodes via adjustable resistors 31, 32, respectively, and a common connection, which includes the terminals A—A and B—B and a capacitor 33. Elements are also connected to the grid circuits to provide stabilisation for the governor, these elements consisting of capacitors 34 and 35 connected between the grids of corresponding tubes and the movable tappings on two series connected resistors 36, 37, forming part of the circuit fed via the connections 38 and 39. Voltage is supplied to the capacitor 33 from the leads 20, 21 via a parallel resonance circuit consisting of a reactor 40 and a capacitor 41, which for the purpose of this description are regarded as having no losses. One of the elements of said circuit shall be adjustable, and this is symbolically shown in the figure for the reactor 40. The means for heating the tube filaments is not shown in the figure, as this is achieved in a conventional manner.

A regulator of the said type has the property that the regulating quantities which are to be fed to its control circuits may either be fed to the grid circuits of the tubes as alternating-current voltages at the points A—A, B—B or as direct-current voltages to those parts of the grid circuits, which are not common. It is also possible to combine these possibilities as shown in the figure.

By feeding the anodes of the tubes in opposite phase from the same voltage supply as that used for the capacitor 33 in the common grid connection, via the resonance circuit 40, 41, the following mode of operation is obtained when the frequency deviates from the resonance frequency setting of the parallel resonance circuit 40, 41. At other frequencies of the voltage feeding the circuit 40, 41, this circuit will carry a reactive current component, the phase of which leads or lags 90° with respect to the voltage between the leads 20, 21, depending upon whether the frequency exceeds or falls below the preset resonance frequency. A voltage drop is thus obtained across the capacitor 33, the phase of which either coincides with or is opposed to the phase of the voltage feeding the anodes of the tubes. The amplitude of the voltage across the capacitor 33 depends on the magnitude of the frequency deviation. By connecting the tubes in so called balance connection, the tubes are so controlled that the anode current for one of the tubes will increase, while that of the other will decrease resulting in a larger current traversing one of the coil halves 29, 30 of the device 3, causing a deflection and displacement of the servo-motor valve. This deflection obviously changes direction when the frequency deviation changes its sign. When the frequency of the voltage between the leads 20 and 21 coincides with the resonance frequency of the parallel resonance circuit 40, 41, the coil halves 29, 30 are traversed by currents of exactly the same magnitude, which nullify each other with regard to their effect on the device.

The diagrammatically shown devices 3 and 4 are identical, and therefore only the elements of device 3 will be particularly described. Control impulses from the electronic regulator are supplied to the two halves 29, 30 of a regulator coil as mentioned before. In the form shown, the coil surrounds a moving core 42 which is balanced by a suitable spring 43, which is anchored at 44. Such a device is further described in the pending patent application Serial No. 2,946, filed January 17, 1948, by Aage Garde, now Patent No. 2,615,466 issued October 28, 1952. The moving system includes a pilot ring 45, which regulates the oil supply to the differential piston 46 by an axial movement of the system. The valves and channels for this purpose are not shown on the Figure. By means of a lever 47, the valve of a hydraulic servo-motor 48 controls the movement of the gate shaft 5.

The potentiometer 13 for controlling the stabilization of the regulator 1 is connected to the direct current side of a full-wave rectifier 49, the alternating current side of which is connected to the leads 20, 21.

On the displacement of the gate shaft 5, the position of the tapping 50 on the potentiometer 13 is varied, and the resulting voltage change between the connections 38, 39 is fed into the grid circuits of the tubes, in which the said change gives rise to voltage drops across the resistors 31, 32 by means of charging currents from the capacitors 34, 35. The said voltage drops cause the output of one of the tubes to increase and that of the other to decrease, and the control effect thus obtained is given such a direction that the original displacement of the gate shaft 5 is counteracted.

By means of the adjustable resistors 31, 32 and 36, 37, the time constant and the transient speed droop of the stabilising device may be adjusted to suitable values.

The gate shaft 5 also operates the variable tapping 51 of the potentiometer 15. The latter is connected to the leads 20, 21. A voltage corresponding to the position of the tapping 51 is supplied to the primary winding of the transformer 52. Similarly, a voltage from the potentiometer 16 of the other prime mover is varied by its gate shaft 6 and supplied to the primary winding of a transformer 53. The secondary windings of the transformers 52, 53 are joined by the lead 54 in such a manner that the secondary voltages are added, and via the resistance winding of a potentiometer 55 and the movable arm 56 of a potentiometer 57, the last mentioned potentiometer being connected to the leads 20, 21. From the potentiometer 55 an adjustable voltage is supplied to the primary winding of transformer 59. In the form shown in the figure, this is shown via a further potentiometer 60, a central tapping of which is connected to the primary winding of the said transformer 59, and the movable arm 61 of which is connected to the potentiometer 55. The potentiometer 60 is fed via the leads 20, 21.

Voltages determined by the positions of the gate shafts are thus added by means of the transformers 52, 53 and are compared with the voltage set on the potentiometer 57. Any difference between these voltages is supplied to the potentiometer 55 and an adjustable part of this voltage is fed to the transformer 59. From the secondary of the said transformer one winding feeds the terminals A—A of the regulator 1, and a further a feeds the corresponding terminals of the regulator 2. If the power station comprises more turbine sets than shown in the figure, voltages determined by the gate shaft positions of those further sets should be introduced into the common current system just described in a similar way, for instance at the terminals 62, 63.

The frequency of the generators 9, 10 is governed by the regulators 1, 2 and is equal to the resonance frequency of the resonance circuits 40, 41. When this condition has been reached, the grids of the tubes 25, 26 have the same control effect. By means of the potentiometer 57, a total power may be set for the power station, which means that a voltage fixed by the arm 56 is compared with the sum of the voltages from the transformers 52, 53, and that a voltage difference is derived causing a voltage between the terminals A—A of the regulators 1, 2 via the transformer 59. The regulators then transmit these control impulses to the devices 3 and 4, so that the position of the wicket gates of the corresponding turbines is altered and consequently the speed of the turbines and the frequency of their tachometer generators. Through the leads 20, 21 the resonance circuits 40, 41 are caused to give a voltage of such a phase across the capacitors 33 that the total voltage in the grid circuits will tend towards zero. If it is desired to alter the normal frequency of the whole station, this may be done by adjusting each one of the reactors 40 of the parallel resonance circuits, but it may also be done by adjusting the potentiometer 60. By means of the potentiometer 55, the speed droop or the regulating capacity of the station may be altered within a wide range.

In a power station, however, with several prime movers, a regulation of the described type is not sufficient, because the regulation is only controlled by the frequency and the sum of the power determined by the positions of the individual gates. Regard must also be paid to the mutual load division.

This necessary complement is effected by the potentiometers 17, 18, controlled by the gate shafts, which are so arranged that the variable tappings 64, 65 of each potentiometer are connected to a common conductor 19 via the primary windings of each of the transformers 66, 67. In the secondary windings of the transformers 66, 67 etc. voltages will be induced which are proportional to the difference between the voltage derived from the corresponding potentiometer, and the mean value of the voltage of all potentiometers in the circuit. These secondary voltages are supplied to the corresponding regulators. In this way, the transformer 66 feeds the terminals B—B of the regulator 1 and the transformer 67 feeds the corresponding terminals of the regulator 2, and they regulate until the said voltage difference is zero. The gate position will in this way be so adjusted that the voltages derived from each potentiometer 17, 18 etc. will be identical.

In order that the voltages from the potentiometers 17, 18 etc. shall be of the same size when the load division between the different sets is the most economic one, the potentiometers must be designed with the help of measured efficiency curves. The equalisation between the gate positions for the different sets is thus quite automatic and will not interfere with the regulating in accordance with the total power derived from the potentiometers 15, 16, etc.

The reason for feeding the regulator from a certain tachometer generator selected by the switch 22 is that thereby full phase similarity is obtained between the control circuits of the different sets.

Within the scope of the invention regulators as well as other elements may be constituted by other suitable units, and the number of auxiliary circuits and the arrangement of these circuits may be varied to fulfill such demands as are mentioned on the first page of this description. Thus it may be convenient to arrange further terminals C—C, D—D etc. supplied by alternating current voltages in the common part of the grid circuits or to introduce direct current voltages in the remaining parts of said circuits, in order to cater for other regulating factors than those mentioned in the description of the figure.

Alterations of the elements used in the described form are also possible. The regulators 1, 2 as described may for instance be constituted by transductor regulators controlled by a number of exciting windings.

The arrangement of the described governor does not prevent the turbine sets from being separately operated. The switches necessary for this purpose are not shown in the drawing.

We claim as our invention:

1. A power station governing system having at least two units, each comprising a prime mover and a generator, a regulator for each prime mover, means for actuating said regulator by electrical quantities, mechanical means responsive to the state of said regulator to control the flow of energy medium to the corresponding prime mover, each regulator being adapted to receive electrical quantities from two separate current systems common to said units, means associated with one of said current systems to derive in it the sum of voltages proportional to the position of each of said mechanical means, means for delivering the difference between an adjustable voltage in said current system and said sum of voltages as an electrical quantity to the control system of each of said regulators, means associated with the other one of said current systems to derive in it voltages proportional to the position of each of said mechanical means, means for delivering as an electrical quantity to each of said regulators a voltage responsive to the difference between the voltage proportional to the position of the mechanical means of the corresponding unit and the mean value of the voltages proportional to the position of the mechanical means of the said units, and a common alternating current source supplying said regulators and said current systems.

2. A governing system according to claim 1, wherein the said regulators are built up by electronic elements, each regulator comprising two balanced thermionic tubes, the anodes of which are fed in phase opposition with voltages from a common alternating current source, a regulator coil of an electro-hydraulic device connected in the anode circuit of each regulator, the coil being divided in two halves, each tube of the regulator energizing one half, the electro-hydraulic device operating the mechanism to control the flow of the energy medium to the units, the currents in the said halves opposing each other, means associated with the grids of said tubes to provide stabilization of the regulator, said stabilization means being connected with the cathodes of the tubes by way of a common connection, terminals in said common connection for receiving alternating current voltages, a capacitor included in said common connection fed by way of a resonance circuit from the anode supply voltage of the tubes, and means for supplying direct current regulating voltages to the stabilization means.

3. A governing system according to claim 2, in which the differential voltage derived in the first-mentioned current system is supplied to a potentiometer from which an adjustable voltage is supplied to a transformer having one secondary winding feeding each regulator.

4. A governing system according to claim 1, in which a potentiometer is provided for each unit controlled by said mechanical means, said potentiometers being connected in parallel and connected to said common alternating current source, the variable tapping of each potentiometer being connected to a conductor common to all regulators by way of the primary winding of a transformer, the secondary winding of which is feeding each regulator.

KNUT ALMSTRÖM.
AAGE GARDE.
SVEN ERIC HEDSTRÖM.
EINAR BRODERSEN.

References Cited in the file of this patent

UNITED STATES PATENTS

| Number | Name | Date |
|---|---|---|
| 1,984,920 | Doyle | Dec. 18, 1934 |
| 1,985,081 | Doyle et al. | Dec. 18, 1934 |
| 2,039,426 | Kerr | May 5, 1936 |
| 2,050,338 | Kerr | Aug. 11, 1936 |
| 2,054,121 | Doyle | Sept. 15, 1936 |
| 2,054,411 | Doyle | Sept. 15, 1936 |
| 2,504,768 | Watson et al. | Apr. 18, 1950 |
| 2,558,729 | Buechler | July 3, 1951 |
| 2,615,466 | Garde | Oct. 28, 1952 |